Figure 1:
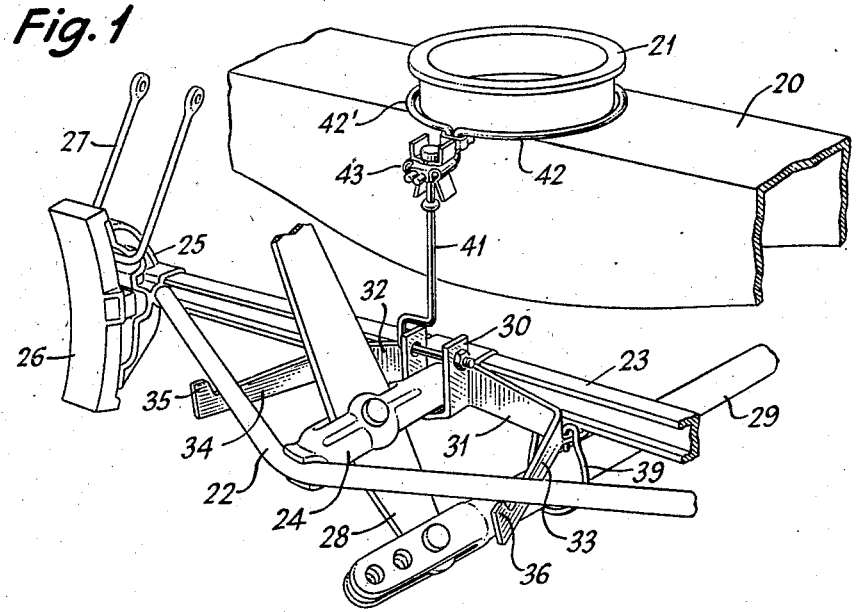

Dec. 30, 1947.　　　　J. MACEY ET AL　　　　2,433,773
BRAKE BEAM AND BOTTOM ROD SUPPORT
Filed Aug. 31, 1944　　　　3 Sheets-Sheet 1

INVENTORS
JOSEPH MACEY AND
LEWIS S. McKEE
BY
William A. Zaksak
ATTORNEY

Dec. 30, 1947.   J. MACEY ET AL   2,433,773
BRAKE BEAM AND BOTTOM ROD SUPPORT
Filed Aug. 31, 1944   3 Sheets-Sheet 2
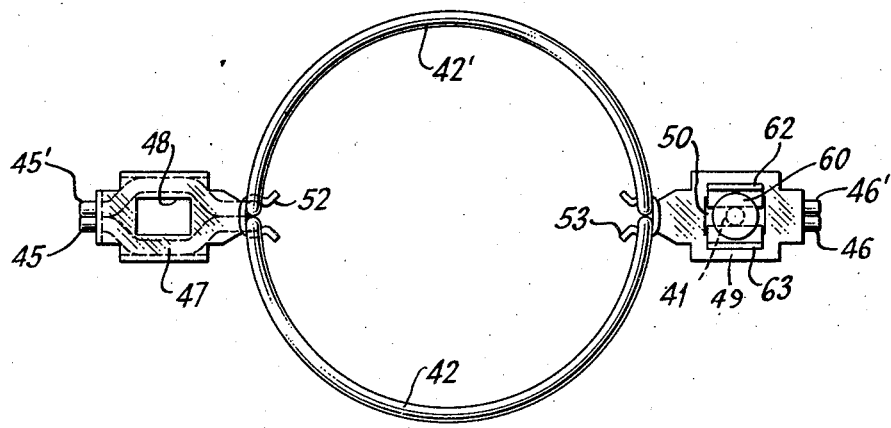
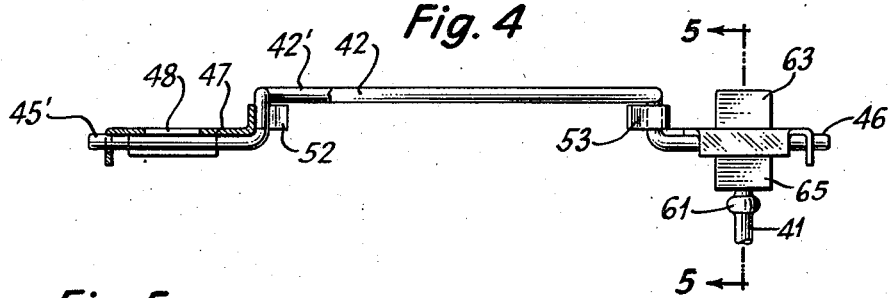
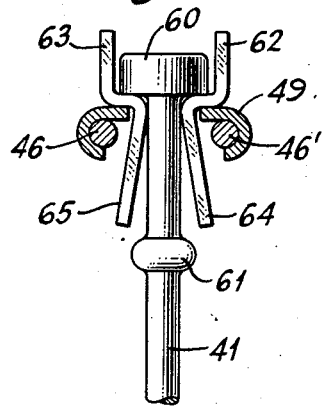
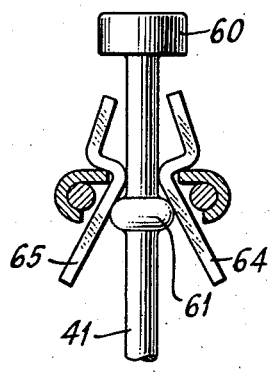
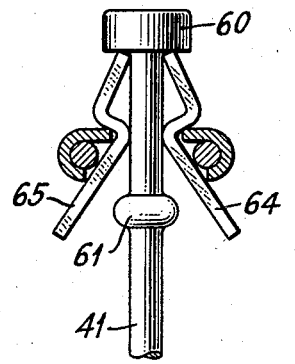
INVENTORS
JOSEPH MACEY AND
LEWIS S. McKEE
BY William A. Zalesak
ATTORNEY Dec. 30, 1947.   J. MACEY ET AL   2,433,773
BRAKE BEAM AND BOTTOM ROD SUPPORT
Filed Aug. 31, 1944   3 Sheets-Sheet 3
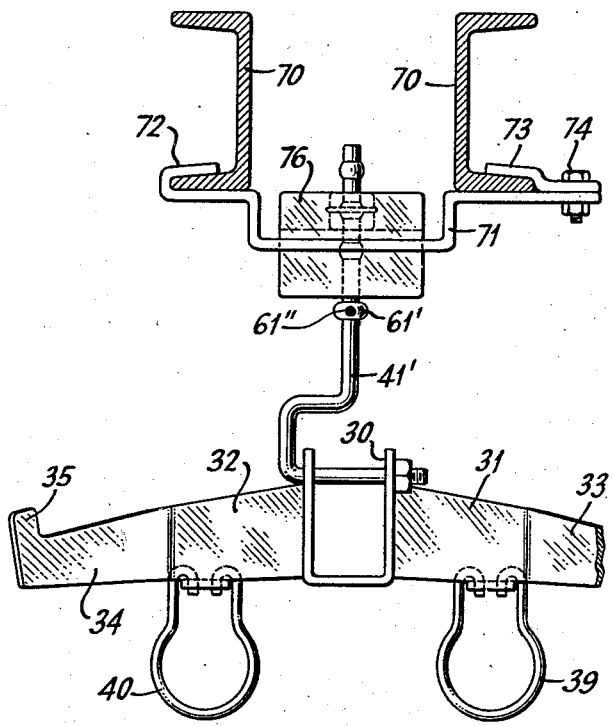
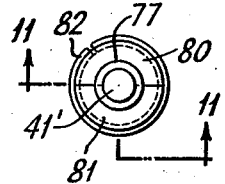
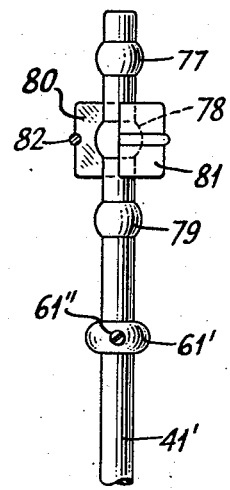
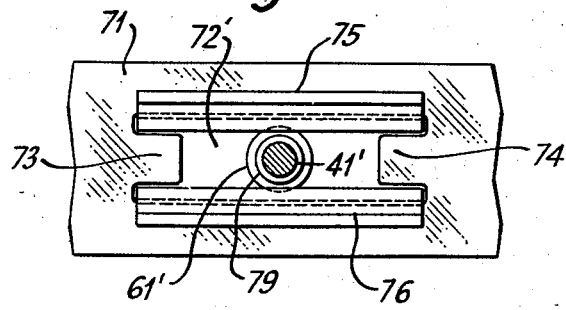
INVENTORS
JOSEPH MACEY AND
LEWIS S. McKEE
BY
William A. Zalesak
ATTORNEY Patented Dec. 30, 1947

2,433,773

UNITED STATES PATENT OFFICE 2,433,773

BRAKE BEAM AND BOTTOM ROD SUPPORT

Joseph Macey, Rahway, and Lewis S. McKee, Roselle, N. J.

Application August 31, 1944, Serial No. 552,134

14 Claims. (Cl. 188—210)

Our invention relates to brake mechanism, more particularly to brake beam and bottom rod supports to be used on railroad freight cars, tank cars and the like.

In the conventional brake beam mechanism, which is attached to the brake shoes, the compression member is joined to the tension rod by means of a centrally positioned strut, the strut being connected to a brake lever and the ends of the compression member and tension rod are secured together at the brake shoes. The brake beam mechanism and brake shoes are supported by brake hangers. Should the brake hangers break, the brake beam assembly can fall to the tracks and cause accidents. The tension rod may also break and fall upon the rails, causing wrecks. The bottom rod, which is attached to the brake lever, may also break loose from the lever and fall to the tracks. While various safety supports are provided there are many objections to the conventional supports.

In the usual brake beam safety support, the supports are hung from the spring plank and held in position by the use of rivets on the underside which are used to hold the brake beam bracket in place. Continued vibration and the weight of the supported elements, however, have a tendency to loosen the rivets. This in turn elongates the rivet holes, weakening the spring plank and causes a fracture across the spring plank causing it to fail. The bottom rod supports in the form of springs or loops are usually hung from the brake beam. An additional brake beam support is necessary. In case of failure of the brake hangers, the brake beam is allowed to drop and be supported by the brake beam supports. Under these conditions the bottom rod may be lowered to such an extent that it may hit the road bed or rails at crossings.

In another form of support, an attachment goes over the bolster securing the brake beam by means of a cable with a U-bolt clamp on each end, but a bottom rod support has to be used for the bottom rod. One of the undesirable features of this support is that in case of failure of one of the brake hangers, one side of the brake beam will tend to rise and the other to lower so that either it or the bottom rod hits the road bed or cross-overs.

With the conventional type of brake beam and bottom rod support, it is necessary in making replacements to dismantle a part of the underframe and remove the trucks to do so. It is also necessary to lie under the car and employ a derrick mechanism or jacks for dismantling the car.

It is, therefore, an object of our invention to provide an improved type of brake beam and bottom rod support.

A further object of our invention is to provide such a support which does not require dismantling of any part or parts of the underframe to apply the support or repair the same.

A still further object of our invention is to provide such a support which can be put in place by workmen while standing on their feet, thus being in position to protect themselves better against injury in case of accidental impact of one car against another.

A further in object of our invention is to provide such a support which does not make use of the spring plank.

Another object of our invention is to provide a support which supports the brake beam, the brake beam strut, tension and compression rods as well as the bottom rod all by a single unit.

A still further object of our invention is to provide such a support which keeps the brake beam assembly balanced.

A further object of our invention is to provide such a support which can be easily repaired at any of the usual blacksmith or repair shops provided for this purpose.

These and other objects will appear hereinafter.

Figure 2:
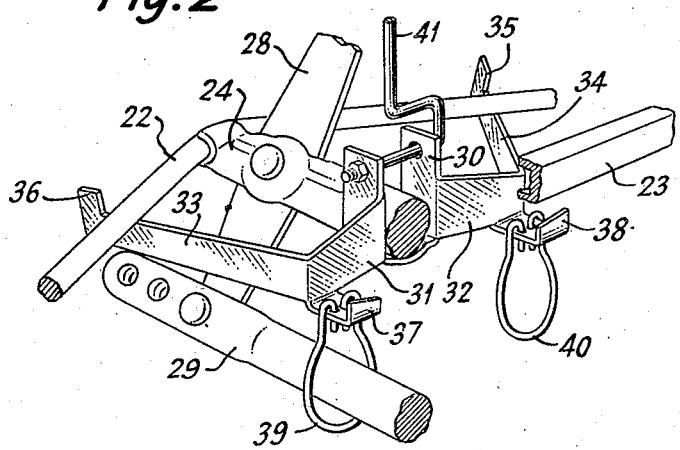

The novel features which we believe to be characteristic of our invention are set forth with particularity in the appended claims, but the invention itself will best be understood by reference to the following description taken in connection with the accompanying drawing in which Figure 1 is a front perspective view of a brake beam assembly utilizing our invention, Figure 2 is a partial back perspective of the assembly shown in Figure 1, Figures 3 and 4 show details of the supporting ring of our invention, Figures 5, 6 and 7 show details of the support at various stages of operation, Figure 8 is a modification of our invention showing the device applied to a sill on a railroad car, Fig. 9 is a detail enlarged of Figure 8, and Figures 10 and 11 show details of the support rod or bolt utilized in Figures 8 and 9.

Referring to Figure 1, our invention is applied to a freight car construction including the usual bolster 20 and bolster ring 21 in front of which is mounted a brake beam assembly. The brake beam assembly comprises tension member 22 and compression member 23 separated at the middle by strut 24 and joined at their ends by means of brake shoe assembly 25, including brake shoe 26 and brake hanger 27. The brake beam assembly is provided with the usual brake lever 28 and bottom rod 29.

In accordance with our invention we provide a safety support which insures a support for the strut, tension and compression members, as well as the bottom rod in case of failure. This device comprises a structure having a U-shaped element 30 from which extend, outwardly, arm elements 31 and 32 having at their ends the forwardly extending tension rod support elements 33 and 34 which extend under and forward of the tension member being turned up at their ends as at 35 and 36. As best shown in Figure 2, extending rearwardly of the safety support and under the compression member 23 are the bracket members 37 and 38 which support the detachable bottom rod supporting loops 39 and 40 so that either a right or left hand bottom rod may be accommodated.

The brake beam safety support assembly is supported in the present case from the bolster ring by means of the J bolt 41 engaging the upper ends of the U-shaped member 30 and supported by the split ring 42, 42' provided with the bracket 43, the details of the ring and bracket being shown in greater detail in Figures 3 to 7 inclusive.

As best shown in Figure 3, the split ring comprises the arcuate shaped elements 42 and 42' having outwardly extending parallel ends 45 and 45' and 46 and 46' which are retained in engagement with each other by means of the clamp sleeves 47 and 49, having the rectangular shaped apertures 48 and 50 for purposes to be described. The spring clamps which slide over the ends 45, 45' and 46, 46' are maintained in position on the end of the half rings by means of the spring clip elements 52 and 53 which are integral with the clamp and engage the vertical portion of the ring extensions as best shown in Figures 3 and 4. As shown in the right hand portion of Figures 3 and 4, the J-bolt extends through the aperture and is engaged on either side by members 62 and 63 as shown in greater detail in Figures 5 and 6.

Inasmuch as there is a difference in the spacing between the brake beam assembly and the bottom of the car in loaded and unloaded conditions, it is necessary to provide some means for the movement of the supporting J-bolt in a vertical direction with respect to the car body, and yet insure support of the proper height in case of brake beam assembly. This is accomplished by means of the arrangement shown in Figures 5 to 7, inclusive, and in the right hand bracket in Figures 3 and 4.

As there shown, the upper end of the J-bolt 41 is provided with bolt head 60. Below the bolt head 60 is an enlarged annular portion 61. When the car is empty the position of the parts is as indicated in Figure 5. However, as the car becomes loaded the J-bolt moves upwardly with respect to clamp sleeve 49 engaging the lower ends 64 and 65 of the pivoted offset elements 62 and 63, rotating these parts outwardly as shown in Figure 6, the upper ends being rotated inwardly against J-bolt 41. In normal unloading the rod 41 moves down slowly with respect to the clamp sleeve 49, permitting lower ends of ends 64 and 65 of elements 62 and 63 to rotate inwardly so that the J-bolt again assumes the position shown in Figure 5, and the bolt head 60 can return to the position shown. This is the position of the brake beam safety support as shown in Figure 1 in the unloaded position. If, however, any portion of the brake beam assembly should break while the car is loaded, permitting the brake beam assembly to fall, the sudden drop of the safety support causes the shoulder of the bolt head 60 to drop upon the upper ends of the elements 62 and 63, trapping them in the position shown in Figure 7, thus maintaining the brake beam assembly in a sufficiently high position above the road bed to prevent contact with the ties or rails.

Because of the means for attaching the safety support to the car by means of the split rings 42 and 42' and the spring clip 47, our device may be readily applied to a car without removing any of the parts. Furthermore, the safety support assembly hanging from the J-bolt may be readily removed by removing the nut on the lower end of the J-bolt and disengaging the same from the brake beam safety support. Likewise spring clips 39 and 40 may be pushed upwardly to release the free ends of these loops to disengage them from the bottom rod. Thus each and every part may be easily removed or put in position without removing any part of the car assembly. It is also obvious that each and every part of the brake beam assembly that may be subject to breakage is provided with a safety support whether it be the strut, the compression or tension members or the bottom rod. Likewise, inasmuch as the supports are provided for both sides for compression and tension members, unbalance is prevented. It is also pointed out that it is immaterial whether the car is loaded or unloaded when breakage occurs, since in either case the brake beam assembly and brake beam safety support are maintained in position sufficiently high to avoid accidents.

In Figures 8 to 11, inclusive, we show a modification of our device so far as the supporting J-bolt is concerned. In some cases it may be advisable to support the brake beam safety support, not from the bolster which forms part of the truck assembly but directly from the body of the car, for example, from the center sills. In this case, however, it is necessary to provide a device which will automatically detach itself from the body of the car should the trucks leave the track. This is accomplished by means of our invention shown in Figures 8 to 11, inclusive.

In Figure 8 our safety support is supported from sills 70 running along under the side of a car body. It includes bracket 71 having the engaging element 72 secured over one edge of the beam and with the removable clamp 73 retained by means of the nut and bolt 74 and engaging an opposite sill. The bracket 71 is provided with elongated slot 72', see Figure 9, into which extend the protruding elements 73 and 74. The elements 75 and 76 are identical to elements 62 and 63 shown in Figures 5 to 7, inclusive, except that they are wider to permit sidewise movement of the J-bolt and safety support assembly. The support, however, functions in exactly the same way as described in Figures 5 to 7, inclusive. Like numbers indicate like parts in Figure 8 and in Figures 1 and 2.

In order to permit the safety device to disengage itself from the body of the car, the support shown in Figures 10 and 11 is utilized. The upper end of the J-bolt 41' is provided with a plurality of enlarged portions 77, 78 and 79. There may be more or less of these portions. One purpose performed by this is to permit the J-bolt to be adjusted for different height cars. The element 61' for operating the pivoted elements 75 and 76 may be made adjustable to be properly positioned for different heights and locked in adjusted position by set screw 61". As shown in Figures 10 and 11 a split nut comprising portions 81 and 80 is retained in position by means of the split spring retaining element 82. If a sufficiently great load or strain is placed upon the nut due to parting of the car trucks and body, the spring retaining element 82 will expand to permit the J-bolt 41' to slip through the nut to release itself from the bracket 71.

Thus with our invention we are able not only to adjust the J-bolt for different brake beam assemblies which may have different spacings between the bottom of the car and the brake beam assembly, but also provide means for emergency detachment in case of parting of the truck and body of the car, thus reducing the possibility of serious wreckage.

While we have indicated the preferred embodiments of our invention of which we are now aware and have also indicated only one specific application for which our invention may be employed, it will be apparent that our invention is by no means limited to the exact forms illustrated or the use indicated, but that many variations may be made in the particular structure used and the purpose for which it is employed without departing from the scope of our invention as set forth in the appended claims.

What we claim as new is:

1. A safety support for a bottom rod and a brake beam assembly having a strut, tension and compression members, said support including a bracket engaging said strut, means extending from said bracket beneath the tension member of said brake beam assembly, and means suspended from said last means for supporting said bottom rod, and means for suspending said support in position.

2. A safety support for a bottom rod and a brake beam assembly having a strut, tension and compression members, said support including a bracket engaging said strut, means extending from said bracket beneath the tension member of said brake beam assembly, a second bracket secured to said means and positioned below the compression member, and means suspended from said last bracket for supporting said bottom rod, and means for suspending said support in position.

3. A safety support for a railroad car bottom rod and brake beam assembly having a strut, tension and compression members, said support including a bracket engaging said strut adjacent said compression member, a pair of arms extending from opposite sides and forwardly of said bracket beneath the tension member of said brake beam assembly, a second bracket secured to said first bracket and positioned below the compression member, and means including a loop suspended from said last bracket for supporting said bottom rod, and means for suspending said support in position on a railroad car.

4. A safety support for a railroad car bottom rod and brake beam assembly having a strut, tension and compression members, said support including a U-shaped bracket receiving said strut, a pair of arms extending from opposite sides of and forwardly of said bracket beneath the tension member of said brake beam assembly, a bracket means secured to said U-shaped bracket and positioned below the compression member, and means including a loop suspended from said last bracket for receiving said bottom rod, and means for suspending said support in position, said means including a J-bolt having one end extending transversely of the legs of the U-shaped bracket, and means at the other end of said bolt for detachably securing said support in position on said railroad car.

5. A safety support for a railroad car bottom rod and brake beam assembly having a strut, tension and compression members, said support including a U-shaped bracket receiving said strut, means extending from said bracket beneath the tension member of said brake beam assembly, and means suspended from said bracket for supporting said bottom rod, and means for suspending said support in position on said car, said means including a J-bolt having one end extending transversely of the legs of the U-shaped bracket above said strut, and means at the other end of said bolt for detachably securing said support in position on said car.

6. A safety support for a railroad car bottom rod and brake beam assembly having a strut, tension and compression members, said support including a U-shaped bracket receiving said strut, means extending from said bracket beneath the tension member of said brake beam assembly, means secured to said bracket and positioned below the compression member, and means suspended from said last means for supporting said bottom rod, and means for suspending said safety support in position, said means including a J-bolt having one end extending transversely of the legs of the U-shaped bracket above said strut, and means at the other end of said bolt for detachably securing said support in position on said railroad car.

7. A safety support for a railroad car brake beam assembly having a strut, tension and compression members, said support including means for engaging said brake beam assembly, and means for suspending said support in position, said means including a bolt having one end engaging said support and means at the other end of said bolt for detachably securing said support in position on a railroad car, the means at the other end of said bolt comprising a split nut held together by a yielding element.

8. A railroad car brake beam and bottom rod support including a support, a suspension member, said suspension member comprising a bolt secured at one end to said support, and means for supporting the other end of said bolt but permitting relative movement of said other end of said bolt with respect to said means, and including a member secured to said railroad car, and pivoted means associated with said other end of said bolt and supported by said last member for permitting normal movement of said bolt but pivoting into clamping engagement with said bolt for preventing sudden downward movement of said bolt and said brake beam and bottom rod support, said bolt having means for causing movement of said pivoted means.

9. A brake beam and bottom rod support including a support, a suspension member, said suspension member comprising a bolt secured at one end to said support, means for supporting the other end of said bolt but permitting relative movement of said other end with respect to said means, and including a member having an aperture through which said other end of said bolt extends, means on said other end of said bolt and cooperating means associated with said aperture and said last means for permitting normal up and down movement of said bolt but preventing sudden downward movement of said bolt and said brake beam and bottom rod support.

10. A railroad car brake beam and bottom rod safety support including a support, a suspension member, said suspension member comprising a bolt secured at one end to said support, means for supporting the other end of said bolt from said car but permitting relative movement of said other end of said bolt with respect to said means, and including a member having an aperture through which said other end of said bolt extends, a protruding element on said other end of said bolt and movable means associated with said aperture and engaging said element for permitting normal up and down movement of said bolt but preventing downward sudden movement of said bolt and said brake beam and bottom rod support.

11. A railroad car brake beam and bottom rod safety support including a support, a suspension member, said suspension member comprising a bolt secured at one end to said support, means for supporting the other end of said support from said car but permitting relative movement of said other end of said bolt with respect to said means, and including a member having an aperture through which said other end of said bolt extends, a shoulder on said other end of said bolt and means associated with said aperture for permitting normal up and down movement of said bolt but preventing sudden downward movement of said bolt and said brake beam and bottom rod, said last means including elements having offset portions and extending through and mounted for pivotal movement within said aperture and means on said rod for pivoting the lower ends of said elements outwardly and the upper ends inwardly to engage the underside of said shoulder on said bolt to limit sudden downward movement of said bolt and said brake beam and bottom rod support.

12. A support for a railroad car bottom rod and brake beam assembly having a strut, tension and compression members, said support including a U-shaped member for engaging said strut, and a pair of members extending forwardly from said U-shaped member beneath the tension member of said brake beam assembly, and a bracket element secured to said first bracket element and extending in the opposite direction from said pair of members and positioned below said compression member, and means including a loop suspended from said bracket element for supporting said bottom rod, said railroad car having a sill and means for suspending said support from the sill of said railroad car and including a clamp removably fastened to said sill.

13. A safety support for a railroad car bottom rod and brake beam assembly having a strut, tension and compression members, said car having a bolster ring, and means for suspending said support from the bolster ring of said railroad car and comprising a pair of oppositely disposed arcuate shaped elements surrounding and engaging opposite sides of the bolster ring, and means for securing said elements in position and comprising means engaging the ends of said elements.

14. A safety support for a railroad car bottom rod and brake beam assembly having a strut, tension and compression members, said car having a bolster ring, and means for suspending said support from the bolster ring of said railroad car and comprising a pair of oppositely disposed arcuate shaped elements surrounding and engaging opposite sides of said bolster ring, and means for securing said elements in position including clips engaging the ends of said element, one of said clips having an aperture and means extending through said aperture in said clip to said safety support for supporting said safety support in position.

JOSEPH MACEY.
LEWIS S. McKEE.

REFERENCES CITED

The following references are of record in the file of this patent:

UNITED STATES PATENTS

| Number | Name | Date |
|---|---|---|
| 1,981,902 | Busse | Nov 27, 1934 |
| 2,040,512 | Busse | May 12, 1936 |